United States Patent
Miyahara et al.

(10) Patent No.: US 9,518,631 B2
(45) Date of Patent: Dec. 13, 2016

(54) VIBRATION DAMPING DEVICE

(71) Applicant: TOYOTA JIDOSHA KABUSHIKI KAISHA, Toyota-shi (JP)

(72) Inventors: Yu Miyahara, Susono (JP); Atsushi Honda, Seto (JP); Husahiro Tsukano, Susono (JP); Morihiro Matsumoto, Susono (JP); Tadashi Sekiguchi, Ashigarakami-gun (JP); Shuhei Horita, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/729,241

(22) Filed: Jun. 3, 2015

(65) Prior Publication Data

US 2015/0377320 A1    Dec. 31, 2015

(30) Foreign Application Priority Data

Jun. 27, 2014   (JP) ................. 2014-132948

(51) Int. Cl.
  *F16F 7/10*     (2006.01)
  *F16F 15/14*    (2006.01)
  *F16H 45/02*    (2006.01)

(52) U.S. Cl.
  CPC .......... *F16F 15/145* (2013.01); *F16F 2230/30* (2013.01); *F16H 2045/0221* (2013.01)

(58) Field of Classification Search
  CPC ...... F16F 9/3207; F16F 15/145; F16F 15/121; F16F 7/1028; F16F 2230/30; F16H 45/02; F16H 2045/0263; F16H 2045/0221; F16D 33/18

USPC ........... 188/378–380; 464/3, 24, 68.1, 68.3; 192/3.28, 201

See application file for complete search history.

(56) References Cited

U.S. PATENT DOCUMENTS

| 6,280,330 B1 * | 8/2001 | Eckel ............... F16F 15/13142 464/3 |
| 9,163,712 B2 * | 10/2015 | Gerdeman ............. F16H 45/02 |
| 2011/0240429 A1 * | 10/2011 | Heuler .................. F16F 15/145 192/3.28 |

(Continued)

FOREIGN PATENT DOCUMENTS

| DE | 100 05 543 A1 | 8/2001 |
| DE | 10 2010 049 930 A1 | 5/2011 |

(Continued)

OTHER PUBLICATIONS

German Office Action issued Jan. 15, 2016 in Patent Application No. 10 2015 109 107.0 (with English language translation).

*Primary Examiner* — Pamela Rodriguez
(74) *Attorney, Agent, or Firm* — Oblon, McClelland, Maier & Neustadt, L.L.P.

(57) ABSTRACT

A vibration damping device in which a covering member can be fixed firmly to a rotary member by a rivet is provided. In the vibration damping device, a pendulum mass 14 is held in a rotary member 15, and a casing 17 is fixed to the rotary member 15 by a rivet 20. The rivet 20 comprises a head 20a, a first shaft 20b and a second shaft 20c. The first shaft 20a penetrates through a first casing member 18, the rotary member 15 and the second casing member 19, and a tail thereof is expanded to fasten those members. The second shaft 20c penetrates through a driven member, and a tail thereof is expanded to fasten the driven member to the rotary member 15.

2 Claims, 8 Drawing Sheets

(56) References Cited

U.S. PATENT DOCUMENTS

| | | |
|---|---|---|
| 2012/0080282 A1 | 4/2012 | Takikawa et al. |
| 2012/0111683 A1* | 5/2012 | Ito .................. F16F 15/145 |
| | | 192/3.28 |
| 2012/0180473 A1 | 7/2012 | Huegel et al. |
| 2014/0374207 A1 | 12/2014 | Amano |
| 2015/0005078 A1 | 1/2015 | Sekiguchi et al. |
| 2015/0377332 A1* | 12/2015 | Miyahara .............. F16H 45/02 |
| | | 192/3.28 |

FOREIGN PATENT DOCUMENTS

| | | |
|---|---|---|
| JP | 2003-4101 | 1/2003 |
| JP | 2012-77823 | 4/2012 |
| JP | 2013-506100 A | 2/2013 |
| JP | WO2013/161058 A1 | 10/2013 |
| WO | WO 2013/128590 A1 | 9/2013 |

\* cited by examiner

VIBRATION DAMPING DEVICE

The present invention claims the benefit of Japanese Patent Application No. 2014-132948 filed on Jun. 27, 2014 with the Japanese Patent Office, the disclosure of which is incorporated herein by reference in its entirety.

BACKGROUND

1. Field of the Invention

The present invention relates generally to the art of a vibration damping device for damping torsional vibrations, and especially to a vibration damping device having a pendulum mass held in a rotary member and oscillated by torque pulses of the rotary member.

2. Discussion of the Related Art

Rotary members such as a drive shaft and gears involving torque transmission between a prime mover to a driven member are vibrated inevitably by torque pulses, load fluctuations, friction etc. Vibration frequency of the rotary member is changed in accordance with a rotational speed, and vibration amplitude is increased by a resonance between an intrinsic vibration frequency of the rotary member itself and the torque pulses applied thereto. Consequently, noises would be increased and the system would be damaged. In order to avoid such disadvantages, according to the conventional art, a vibration damping device is widely used in power transmission systems.

For example, international publication WO 2013/128590 describes a vibration damping device. According to the teachings of WO 2013/128590, pendulum masses and coil springs are arranged concentrically so that the damping device can be downsized.

However, if a casing member is fixed to the rotary member by a rivet in the vibration damping device taught by WO 2013/128590, a long rivet is required and such long rivet may be deformed easily when a tail of a shaft is expanded. For this reason, a required fastening strength between those members may not be achieved.

The present invention has been conceived noting the foregoing technical problems, and it is therefore an object of the present invention is to fix a casing member covering a pendulum damper firmly by a rivet.

SUMMARY OF THE INVENTION

The present invention relates to a vibration damping device, comprising: a pendulum mass that is held in a rotary member while being allowed to be oscillated by torque pulses applied to the rotary member; a casing including a first casing member and a second casing member individually fixed to each surface of the rotary member by a rivet to cover the pendulum mass liquid-tightly; and a predetermined member that is also fixed to the rotary member by the rivet in a manner to transmit torque therebetween. In order to achieve the above-mentioned objective, according to the present invention, the rivet is comprised of a head, a first shaft axially protruding from one side of the head, and a second shaft axially protruding from the other side of the head in an opposite direction. Specifically, the first shaft penetrates through the first casing member, the rotary member and the second casing member overlapped one another, and a tail of the first shaft is expanded to fasten those members together. Whereas, the second shaft penetrates through the predetermined member, and a tail of the second shaft is expanded to fasten the predetermined member to said another side of the head of the rivet.

Further, the first shaft is formed to have a greater compressive strength than that of the second shaft.

Thus, according to the present invention, only the first casing member, the rotary member and the second casing member are fastened together through the first shaft of the rivet, and the predetermined member is fastened to the rotary member through the second shaft of the rivet. For this reason, loads applied to the first and the second shafts can be lightened respectively so that lengths of the first and the second shaft can be shortened respectively. According to the present invention, therefore, the first casing member, the second casing member and the driven member can be fixed firmly to the rotary member by the common rivet.

In addition, the first shaft of the rivet is formed to have a diameter larger than that of the second shaft so that a compressive strength of the first shaft is increased to be higher than that of the second shaft. According to the present invention, the tail of the first shaft is expanded first to fasten the above-mentioned members, and then the tail of the second shaft is expanded to fasten the predetermined member to the rotary member. Since the compressive strength of the first shaft is thus enhanced, a so-called buck-tail as a deformed tail of the first shaft that is expanded previously will not be loosened by shocks or impact to expand the tail of the second shaft.

BRIEF DESCRIPTION OF THE DRAWINGS

Features, aspects, and advantages of exemplary embodiments of the present invention will become better understood with reference to the following description and accompanying drawings, which should not limit the invention in any way.

FIG. 1 is a cross-sectional view showing a first example of the vibration damping device;

FIG. 6 is a cross-sectional view showing a rivet according to a comparative example, in which

FIG. 7 is a partial cross-sectional view showing the rivet according to the preferred example, in which

FIG. 8 is a cross-sectional view showing diameters of the shafts of a rivet according to another comparative example, in which FIG. 9 is a cross-sectional view showing diameters of the shafts of the rivet according to the preferred example, in which

DETAILED DESCRIPTION OF THE PREFERRED EMBODIMENT(S)

The following description relates to the vibration damping device of the present invention, and a principle of vibration damping action is similar to those taught by the prior art documents cited in the background. Turning first to FIG. 1, there is shown a torque converter 1 according to the first example having a torsional vibration damping device 2 and a lockup clutch 3. A front cover 4 is connected to a pump shell 5 to form a housing of the torque converter 1, and an input shaft 6 penetrates through a center axis of the housing. In order to transmit torque to a not shown transmission, a turbine hub 7 is fitted onto the input shaft 6 to be rotated integrally therewith while being connected to a turbine runner 8 and a lockup clutch 3. Further, the torsional vibration damping device 2 is fitted onto the turbine hub through a spline.

As known in the conventional art, the turbine runner 8 is disposed to be opposed to a pump impeller 9 and rotated by a spiral oil flow created by the pump impeller 9.

The lockup clutch 3 is hydraulically engaged with an inner face of the front cover 4 to enable torque transmission, and the torque transmission is disabled by reducing hydraulic pressure applied to the lockup clutch 3 to withdrawn the lockup clutch 3 from the front cover 4. The lockup clutch 3 is also connected to a lockup damper 10 adapted to absorb vibrations elastically. Specifically, the lockup damper 10 is comprised of a drive member 11 connected to the lockup clutch 3, and a driven member 13 connected to the drive member 11 through a coil spring 12.

Figure 2:
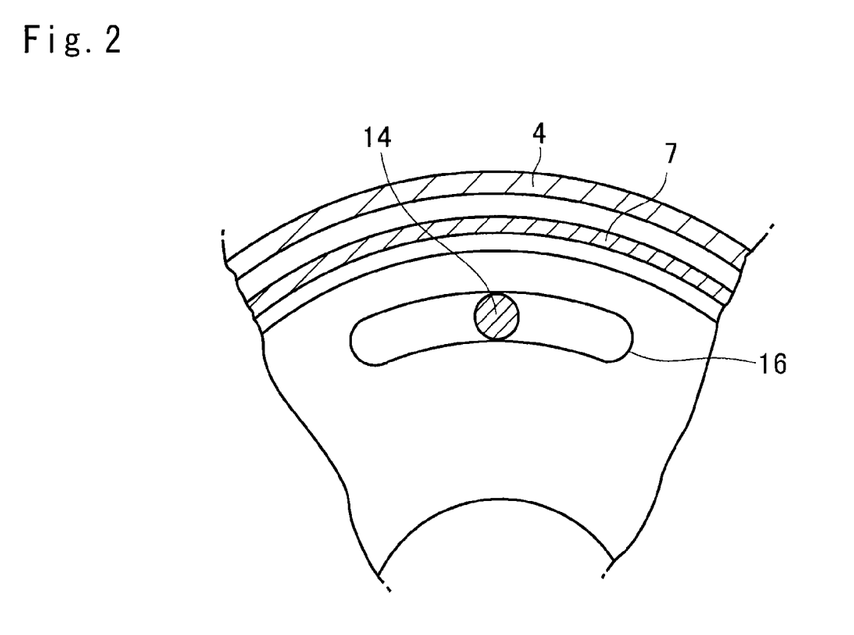
FIG. 2 is a partial view schematically showing a guide hole and the rotary member.

The torsional vibration damping device 2 is disposed between the turbine runner 8 and the lockup clutch 3 or the lockup damper 10. In the torsional vibration damping device 2, a pendulum mass 14 is held in a disk shaped rotary member 15. As partially illustrated in FIG. 2, a plurality of guide holes 16 are formed on radially outer side of the rotary member 15 at substantially regular intervals in a circumferential direction. The pendulum mass 14 is formed into a column shape or disk shape having diametrically larger flange portions on both thickness ends, and held in each guide hole 16 while being engaged with an edge of the guide hole 16. That is, the pendulum mass 14 is allowed to oscillate within the guide hole 16 without causing disengagement. Structures of the guide hole and the pendulum mass are described in more detail in the international publication WO 2013/128590.

In order not to disturb an oscillating motion of the pendulum mass 14 by oil, a radially outer portion of the rotary member 15 where the pendulum mass 14 are held is covered liquid-tightly by a casing 17. Specifically, the casing 17 is comprised of a pair of first casing member 18 and second casing member 19, and radially outer portions of those casing members 18 and 19 are individually expanded in an axial direction in a manner to hold the pendulum mass 14 without being contacted therewith. A radially outer end portion of the first casing member 18 is bent to be connected to that of the second casing member 19, and those end portions are welded to each other.

A radially outer portion of the rotary member 15 is clamped by inner circumferential portions of the first and the second casing members 18 and 19 and fixed together by a rivet 20 axially penetrating through those members. Further, the driven member 13 of the lockup damper 10 is also fixed to the rotary member 15 by the rivet 20. In order to protect the pendulum mass 14 from the oil, a sealing member 21 is individually interposed between each surface of the rotary member 15 and the first and the second casing member 18 and 19.

Figure 3:
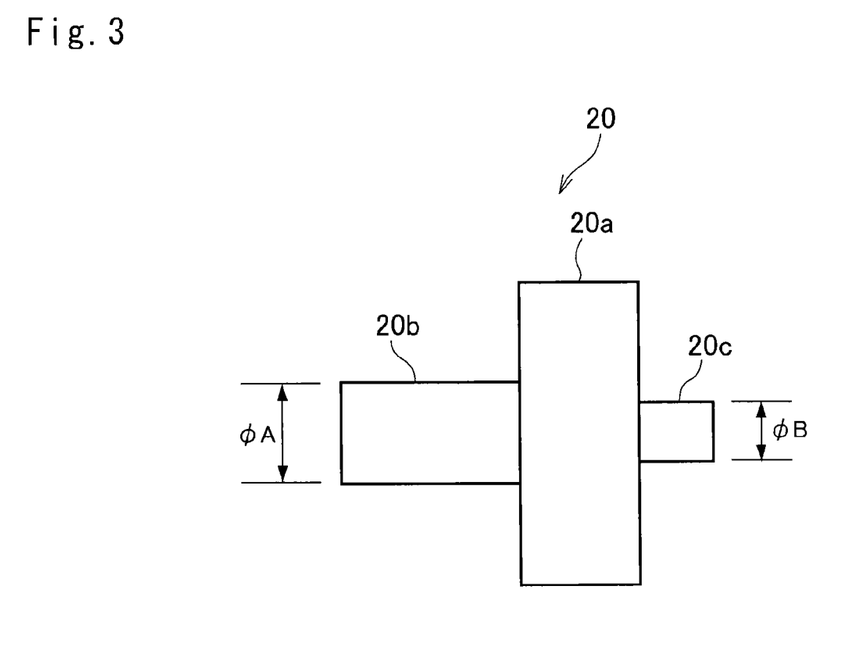
FIG. 3 is a cross-sectional view showing the rivet.

A structure of the rivet 20 will be explained in more detail with reference to FIG. 3. As can be seen from FIG. 3, the rivet 20 is comprised of a head 20a, a first shaft 20b axially protruding from one side of the head 20a, and a second shaft 20c axially protruding from the other side of the head 20a in an opposite direction.

Referring back to FIG. 1, the first casing member 18, the rotary member 15, and the second casing member 19 are overlapped in the axial direction, and those members are fixed together by the first shaft 20b of the rivet 20 axially penetrating therethough, and a tail of the first shaft 20b is upset or bucked (i.e., deformed to be expanded). On the other hand, the driven member 13 of the lockup damper 10 is fixed to those members 15, 18 and 19 by the second shaft 20c of the rivet 20, and a tail of the second shaft 20c is upset or bucked.

Thus, according to the first example shown in FIG. 1, the rotary member 15, the first casing member 18 and the second casing member 19 are fastened together through the first shaft 20b of the rivet 20, and the driven member 13 of the lockup damper 10 is fastened to the rotary member 15 by the second shaft 20c of the rivet 20. That is, the rotary member 15, the first casing member 18, the second casing member 19 and the driven member 13 are not fastened together by a common shaft so that loads applied to each shafts 20b and 20c can be lightened respectively. For this reason, lengths of the first shaft 20b and the second shaft 20c can be shortened so that the first casing member 18, the second casing member 19 and the driven member 13 can be fixed firmly to the rotary member 15 by the common rivet 20.

In addition, the first shaft 20b is formed to have a diameter larger than that of the second shaft 20c so that a compressive strength of the first shaft 20b is increased to be higher than that of the second shaft 20c. According to the preferred example, the tail of the first shaft 20b thus having the higher compressive strength is expanded first to fasten the first casing member 18 and the second casing member 19 to the rotary member 15, and then the tail of the second shaft 20c is expanded to fasten the driven member 13 to the rotary member 15. Since the compressive strength of the first shaft 20b is thus enhanced, a so-called buck-tail as the deformed tail of the first shaft 20b that is expanded previously will not be loosened by shocks or impact to expand the tail of the second shaft 20c.

Further, according to the preferred example, a leak diagnostic in the torsional vibration damping device 2 can be performed after fastening the first casing member 18 and the second casing member 19 to the rotary member 15 by the first shaft 20b, but before fastening the driven member 13 to the rotary member 15 by the second shaft 20c. If some kind of defect is found in the torsional vibration damping device 2, only a defective member in the torsional vibration damping device 2 has to be replaced, and in this case, it is not necessary to replace the driven member 13 that is not involved in establishing the liquid-tightness of the torsional vibration damping device 2.

Furthermore, number of the members fastened by a common shaft of the rivet 20 can be reduced so that the torsional vibration damping device 2 can be assembled accurately and easily while eliminating erroneous assembly.

Figure 4:
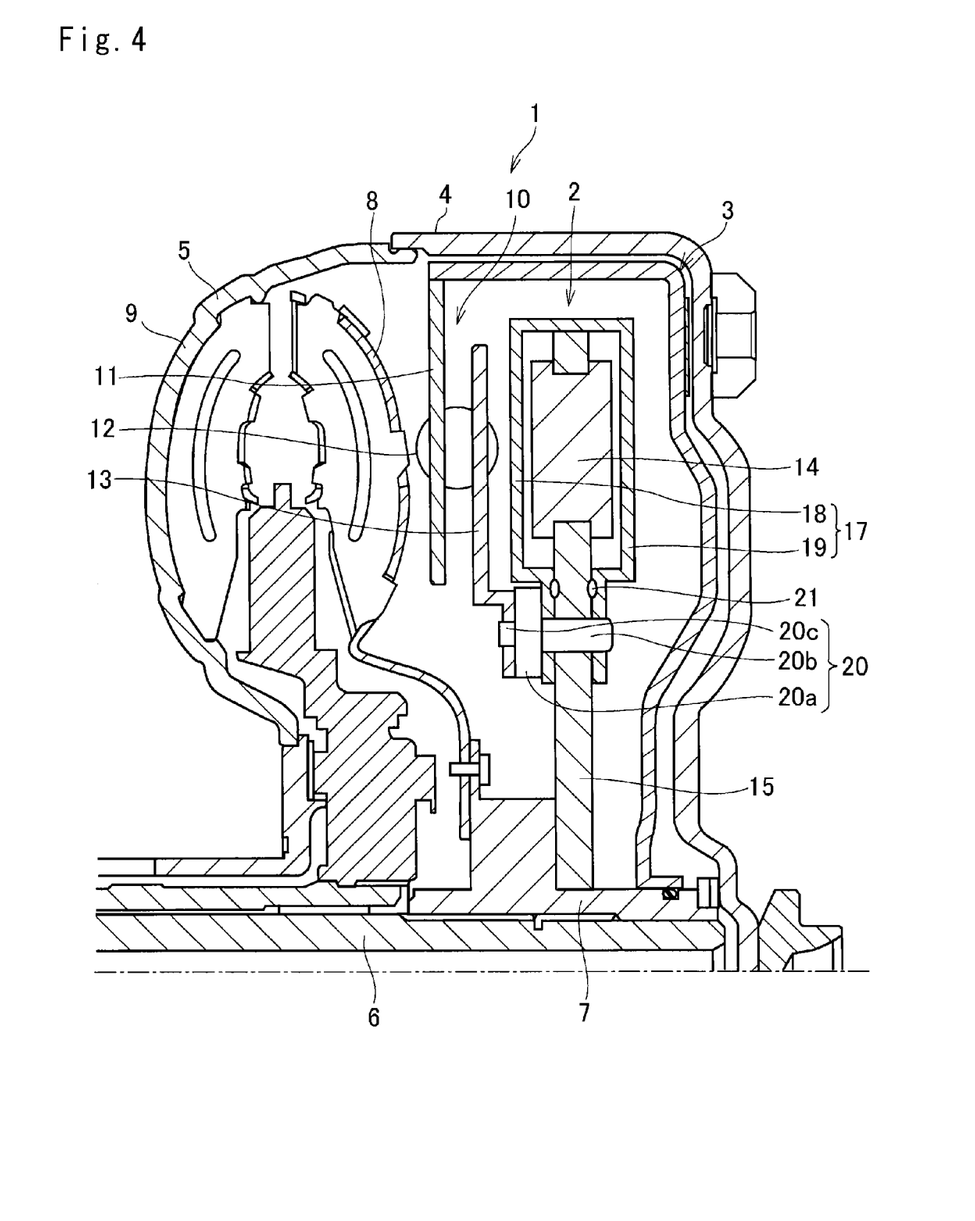
FIG. 4 is a cross-sectional view showing a second example of the vibration damping device.

A position of the torsional vibration damping device 2 should not be limited to that shown in FIG. 1. For example, according to the second example shown in FIG. 4, the torsional vibration damping device 2 may be disposed between the lockup clutch 3 and the lockup damper 10. In this case, the first casing member 18 and the second casing member 19 are also fastened to the rotary member 15 by the first shaft 20b of the rivet 20, and the driven member 13 is fastened to the rotary member 15 by the second shaft 20c.

Figure 5:
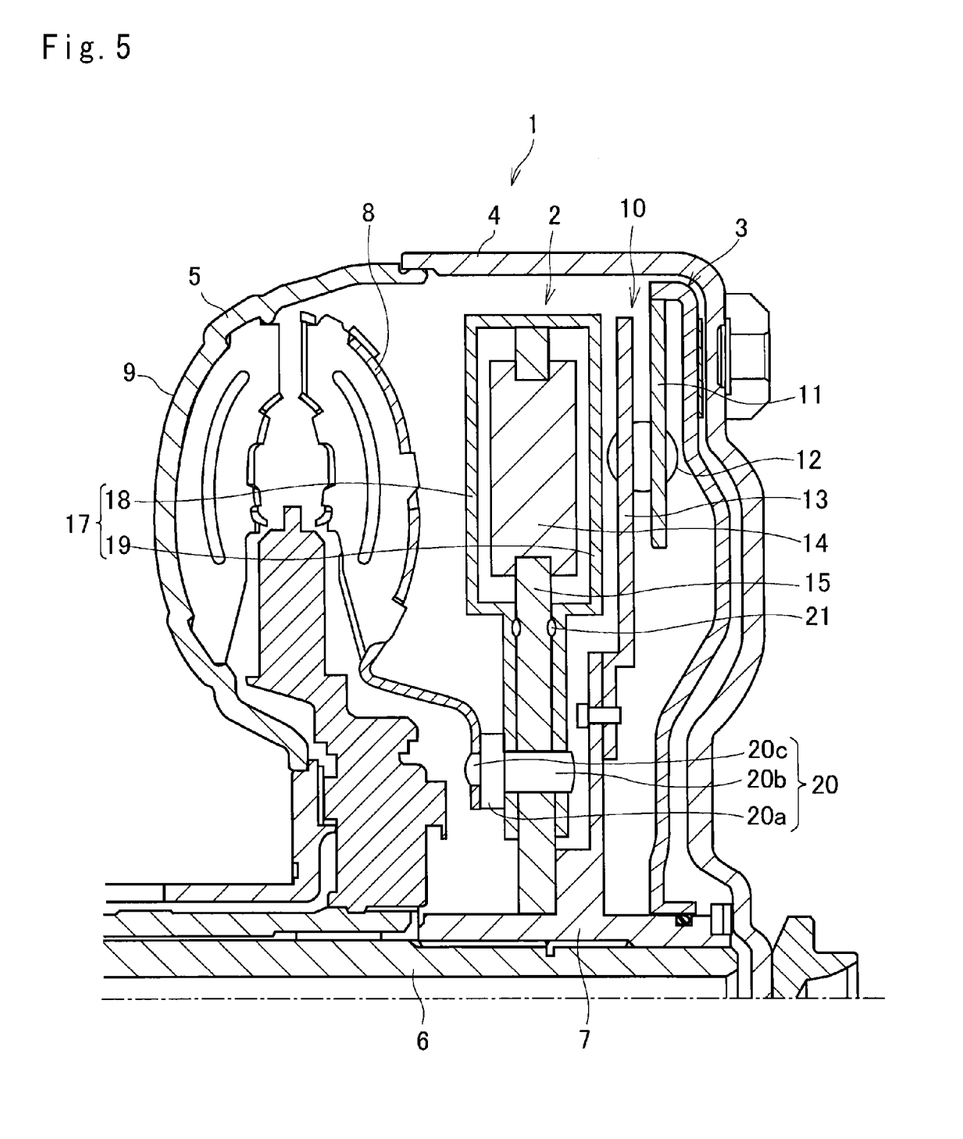
FIG. 5 is a cross-sectional view showing a third example of the vibration damping device.

Instead, according to the third example shown in FIG. 5, the torsional vibration damping device 2 may also be disposed between the turbine runner 8 and the lockup damper 10. In this case, the first casing member 18 and the second casing member 19 are also fastened to the rotary member 15 by the first shaft 20b of the rivet 20, but the turbine runner 8 is fastened to the rotary member 15 by the second shaft 20c.

As described, according to the preferred examples, the compressive strength of the first shaft 20b for fastening the first and the second casing member 18 and 19 to the rotary member 15 is enhanced to be higher than that of the second shaft 20c for fastening the driven member 13 or the turbine runner 8 to the rotary member 15. Advantages of the rivet 20 thus structured will be explained with reference to the comparative examples shown in FIGS. 6 to 8.

Figure 6A:
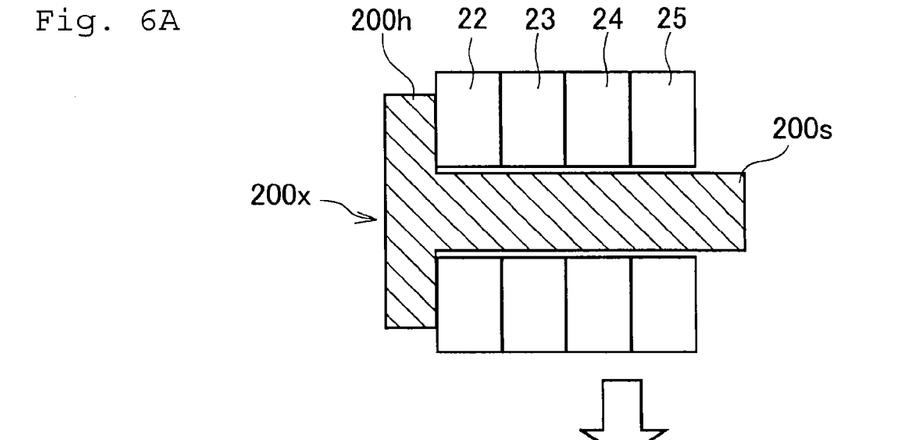
FIG. 6A shows a situation before a tail of a shaft is expanded.
Figure 6B:
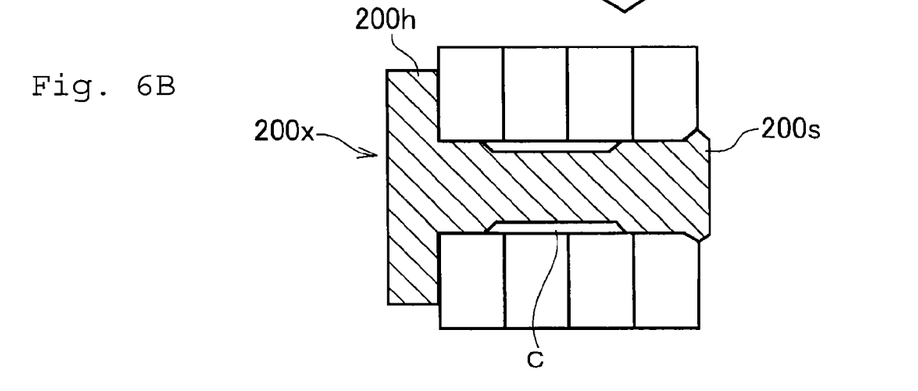
FIG. 6B shows a situation after the rail of the shaft is expanded.

According to the comparative example shown in FIG. 6, a rivet 200x having a head 200h and a shaft 200s is used to fasten four members 22 to 25. Specifically, FIG. 6 (a) shows a situation where the shaft 200s is inserted into installation holes of the members 22 to 25, and FIG. 6 (b) shows a situation where a tail of the shaft 200s is expanded to fasten the members 22 to 25. In this case, a length of the shaft 200s has to be elongated to fasten the four members 22 to 25 in comparison with that of the preferred examples and hence a compressive strength of the shaft 200s cannot be ensured sufficiently. That is, if the tail of the shaft 200s is subjected to a compressive load to be expanded, the shaft 200s would be bent or deformed undesirably and hence a clearance C remains between the shaft 200s and inner circumferences of the installation holes of the four members 22 to 25.

Figure 7A:
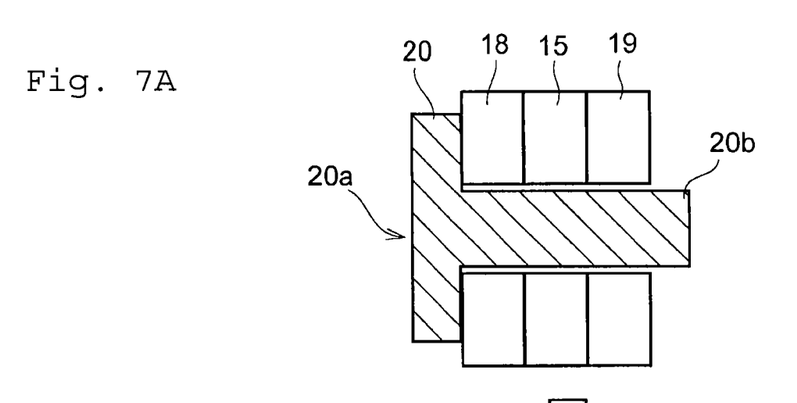
FIG. 7A shows a situation before the tail of the shaft is expanded.
Figure 7B:
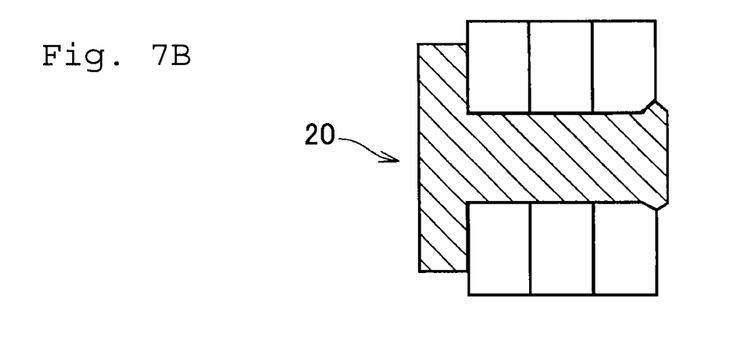
FIG. 7B shows a situation after the tail of the shaft is expanded.

In turn, referring now to FIG. 7, there is shown a partial sectional view of the rivet 20 according to the preferred examples. Specifically, FIG. 7 (a) shows a situation where the shaft 20a is inserted into installation holes of the first casing member 18, the rotary member 15 and the second casing member 19, and FIG. 6 (b) shows a situation where the tail of the first shaft 20b is expanded to fasten the members 18, 15 and 19. According to the preferred examples, since the length of the first shaft 20b is shorter than that of the rivet 200x of the comparative example shown in FIG. 6, the first shaft 20b will not be bent or deformed undesirably without space as shown in FIG. 8 (b) even if the tail thereof is subjected to the compressive load to be expanded.

Figure 8A:
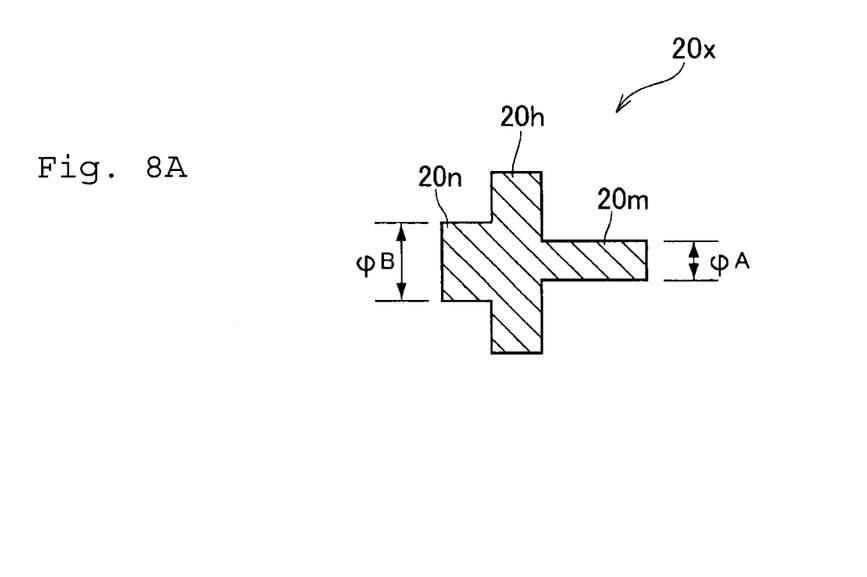
FIG. 8A shows a situation before a tail of a first shaft is expanded.
Figure 8B:
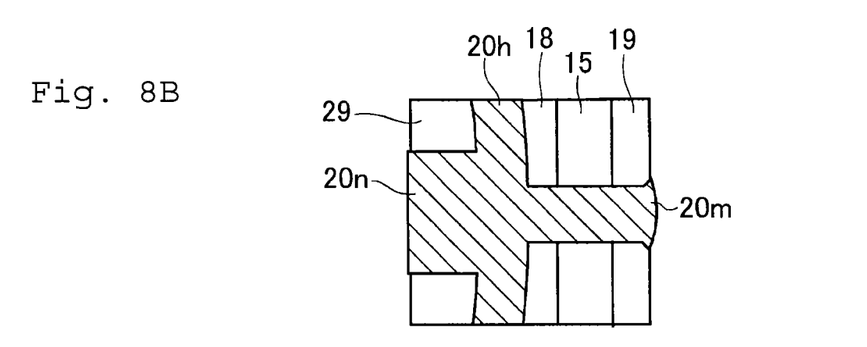
FIG. 8B shows a situation after the tail of the first shaft is expanded.

FIG. 8 shows another comparative example of the rivet in which diameters of shafts are differentiated. As shown in FIG. 8 (a), according to another example, a rivet 20x has a head 20h, a first shaft 20m protruding from one side of the head 20h, and a second shaft 20n protruding from an opposite side of the head 20h. A length of the first shaft 20m is longer than that of the second shaft 20n, but a diameter B of the second shaft 20n is larger than a diameter A of the first shaft 20m. In this case, the first shaft 20m is inserted into installation holes of the first casing member 18, the rotary member 15 and the second casing member 19 first of all, and a tail of the first shaft 20m is expanded to fasten the members 18, 15 and 19. Then, the second shaft 20n is inserted into an installation hole of another predetermined member 29, and a tail of the second shaft 20n is expanded to fasten the member 29 to the rotary member 15. In this case, a greater compressive load is applied to the second shaft 20n having a larger diameter B in comparison with that applied to the first shaft 20m having a smaller diameter A, and hence the head 20h would be deformed as illustrated in FIG. 8 (b). Consequently, connection among the first casing member 18, the rotary member 15 and the second casing member 19 would be loosened.

Figure 9A:
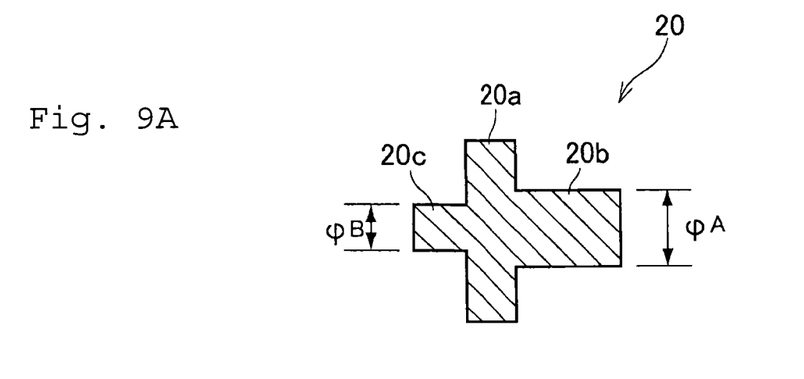
FIG. 9A shows a situation before the tail of the first shaft is expanded.
Figure 9B:
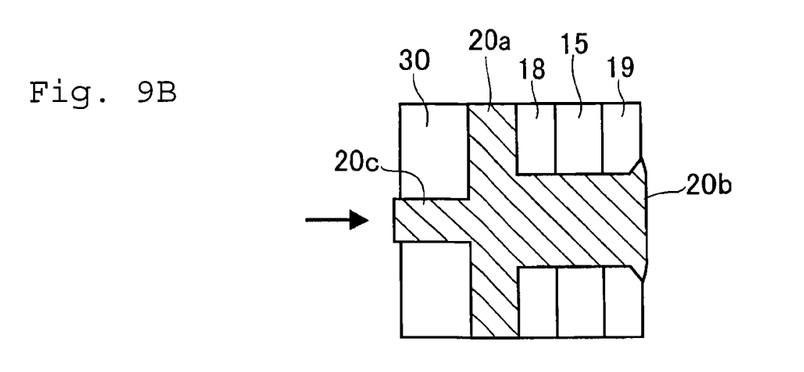
FIG. 9B shows a situation after the tail of the first shaft is expanded.

By contrast, according to the preferred examples, a diameter A of the first shaft 20b that is longer than the second shaft 20c is larger than a diameter B of the second shaft 20c as illustrated in FIG. 9 (a). According to the preferred examples, the first shaft 20b is inserted into installation holes of the first casing member 18, the rotary member 15 and the second casing member 19 first of all, and the tail of the first shaft 20b is expanded to fasten the members 18, 15 and 19. Then, the second shaft 20b is inserted into an installation hole of a predetermined member 30, and a tail of the second shaft 20b is expanded to fasten the member 30 to the rotary member 15. According to the preferred examples, a compressive load applied to the second shaft 20c having the diameter B smaller than the diameter A of the first shaft 20b is weaker than that applied to the first shaft 20b, and hence the head 20a of the rivet 20 will not be deformed as illustrated in FIG. 9 (b). For this reason, the first casing member 18, the rotary member 15 and the second casing member 19 can be fastened together tightly.

Although the above exemplary embodiments of the present invention have been described, it will be understood by those skilled in the art that the present invention should not be limited to the described exemplary embodiments, but that various changes and modifications can be made within the spirit and scope of the present invention. For example, any kinds of members rotated integrally with the rotary member 15 may be fastened thereto through the second shaft 20c instead of the driven member 13.

What is claimed is:

1. A vibration damping device, comprising:
   a pendulum mass that is held in a rotary member while being allowed to be oscillated by torque pulses applied to the rotary member,
   a casing including a first casing member and a second casing member individually fixed to each surface of the rotary member by a rivet to cover the pendulum mass liquid-tightly; and
   a predetermined member that is also fixed to the rotary member by the rivet in a manner to transmit torque therebetween;
   wherein the rivet comprises a head, a first shaft axially protruding from one side of the head, and a second shaft axially protruding from the other side of the head in an opposite direction;
   wherein the first shaft penetrates through the first casing member, the rotary member and the second casing member overlapping one another, and a tail of the first shaft is expanded to fasten the first and second casing members and the rotary member together; and
   wherein the second shaft penetrates through the predetermined member, and a tail of the second shaft is expanded to fasten the predetermined member to said another side of the head of the rivet.

2. The vibration damping device as claimed in claim 1, wherein a compressive strength of the first shaft is increased to be higher than that of the second shaft.

\* \* \* \* \*

UNITED STATES PATENT AND TRADEMARK OFFICE
CERTIFICATE OF CORRECTION

PATENT NO. : 9,518,631 B2  
APPLICATION NO. : 14/729241  
DATED : December 13, 2016  
INVENTOR(S) : Yu Miyahara et al.

Page 1 of 1

It is certified that error appears in the above-identified patent and that said Letters Patent is hereby corrected as shown below:

On the Title Page

Item (72), Third inventor's name: change "Husahiro Tsukano" to --Fusahiro Tsukano--.

Signed and Sealed this  
Twenty-eighth Day of May, 2019

Andrei Iancu  
*Director of the United States Patent and Trademark Office*